United States Patent [19]

Naftzger et al.

[11] Patent Number: 4,621,325

[45] Date of Patent: Nov. 4, 1986

[54] METHOD FOR MONITORING RECEIPT AND STOCKING OF GOODS IN A DIRECT STORE DELIVERY

[75] Inventors: Walter L. Naftzger, Dallas; Charles M. O'Banon, Lewisville, both of Tex.

[73] Assignee: Information Retrieval Methods, Inc., Dallas, Tex.

[21] Appl. No.: 617,580

[22] Filed: Jun. 6, 1984

[51] Int. Cl.⁴ .......................................... G06F 15/24
[52] U.S. Cl. .................................... 364/406; 235/385
[58] Field of Search ...................... 235/385, 384, 383; 364/403, 406

[56] References Cited

U.S. PATENT DOCUMENTS

| | | | |
|---|---|---|---|
| 4,141,078 | 2/1979 | Bridges | 364/403 |
| 4,180,204 | 12/1979 | Koenig | 235/385 |
| 4,340,810 | 7/1982 | Glass | 235/385 |
| 4,514,815 | 4/1985 | Anderson | 235/385 |

OTHER PUBLICATIONS

"An On-Line, Distributed Processing & Data Collection System", The Western Electric Engineer, vol. 23, No. 2 (4/79) pp. 46–52.

Primary Examiner—Jerry Smith
Assistant Examiner—Gail Hayes
Attorney, Agent, or Firm—Richards, Harris, Medlock & Andrews

[57] ABSTRACT

A method is provided for monitoring the receipt and stocking of batches of goods in a direct store delivery. A vendor enters a worksheet (22) via a wand scanner (12) where the vendor's information is stored in a computer (16). A store check-in sheet (32) is produced from the stored information. A receiving clerk audits the received goods and enters a clerk audit into the scanner (12). When the vendor and receiving clerk are satisfied with a store invoice (33) the goods are released from a location (34) for ultimate product stocking. Optional audits are provided by a management agent at a location (46) and by a security audit (50). These last audits can be entered via the scanner (12) to add to the information about the goods. Finally, management reports (64) are prepared which identify any discrepancies in the receipt and stocking of goods and indicate any trend for particular losses.

10 Claims, 1 Drawing Figure

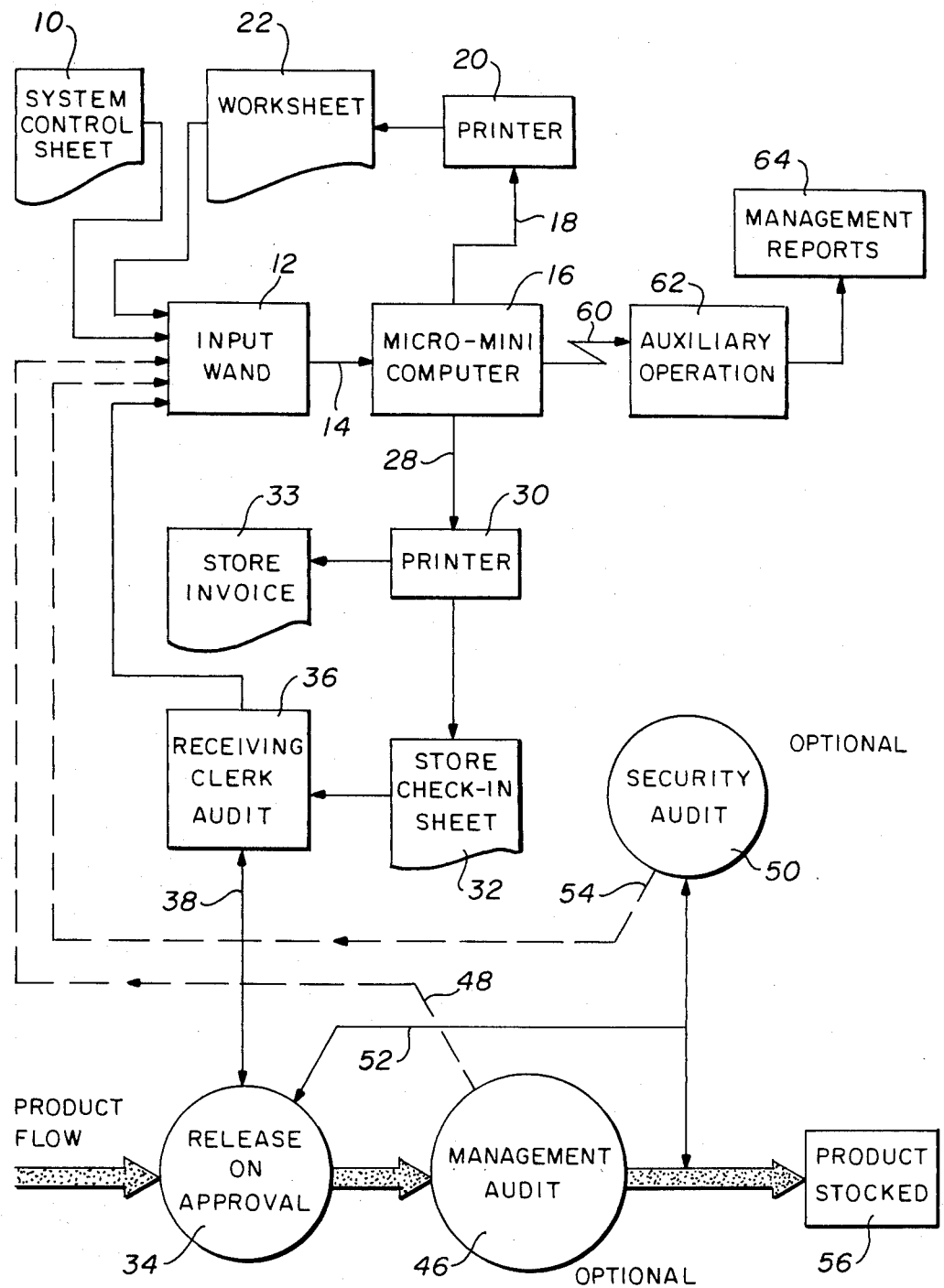

METHOD FOR MONITORING RECEIPT AND STOCKING OF GOODS IN A DIRECT STORE DELIVERY

TECHNICAL FIELD

This invention pertains to a method for verifying delivery of batches of goods from a delivery entity directly to a receiving entity.

BACKGROUND OF THE INVENTION

In tracking goods delivered from a manufacturer's plant or from a warehouse to a receiving station such as a dock operated by a purchaser and onto which vendors make deliveries, there is a necessity for a reliable record of each transaction in order to discover or prevent theft or error. Approximately one third of the goods currently delivered are routed from a manufacture or storage facility directly to the purchaser's dock. In some cases, delivery is to the purchaser from an authorized distributor of such goods under contract with a source of the goods. An accurate set of records which truly reflect the operations is necessary.

Information processing generally begins at the receiving dock. The vendor normally supplies a paper record of each transaction at the time of delivery. The record may or may not accurately portray the actual transaction.

The vendor and/or a receiving clerk at this point in the transaction may engage in a plan to defraud the purchaser by diverting some of the listed goods to their own possession while falsifying the record to avoid detection of the theft. The vendor may report delivery to the dock of all of an item ordered by the purchaser when in fact less than all goods ordered are actually delivered to the dock.

A clerk generally is given the responsibility to check the vendor's invoice or record reflecting the transaction against the goods delivered. While normally the clerk monitors the traffic of the vendor, the purchaser may make his own assessment of the accuracy of the documents dealing with the delivery by the vendor and/or the clerk.

Circumstances may be such that the clerk and the vendor cooperate to defraud the purchaser.

The vendor and clerk may plot together in a scheme involving reporting delivery of more goods than actually delivered. The non-delivered items then are marketed or otherwise disposed of with the vendor and the clerk sharing in the proceeds.

Further instances have been discovered wherein the clerk, on his own, reports delivery of less than the number of items actually received thus providing basis to traffic in goods received but not reported.

Apparent is the need for a system for sensing and processing data that will signal discrepancies in the record of items reported as delivered where a vendor or a clerk acting alone or in concert commit a theft.

The present invention involves a system and operation thereof based on controllable input data to detect defalcations of either the vendor or the clerk acting alone or in concert in an attempt to defraud the purchaser.

SUMMARY OF THE INVENTION

A selected embodiment of the present invention comprises a method for indicating discrepancies of goods in direct store delivery for discrete identifiable units of goods. The method includes the steps of storing in a memory on a batch by batch basis a vendor's count of the units in each batch of delivered goods. There is next stored in the memory on a batch by batch basis a clerk's count of the units in each batch of goods which are acknowledged as received by the clerk. A comparison is made of the stored vendor's count and the stored clerk's count of the units in each batch of goods to produce an invoice report for each batch. There is next stored in the memory a management count of units in selected test batches of the goods prior to the stocking of the goods. There is next stored in memory a security count of units in selected test batches of goods prior to the stocking of the goods. Finally, a comparison is made of the management and/or security count of units in at least one of the selected test batches to stored counts of the clerk and of the vendor whereby trends in discrepancies between the stored counts for the corresponding batches will be indicative of unlawful or inaccurate handling of the goods.

BRIEF DESCRIPTION OF THE DRAWINGS

For a more complete understanding of the invention and for further objects and values thereof, reference may now be had to the following description taken in conjunction with the accompanying drawings in which the FIGURE is a block diagram including a flow chart of a system of one embodiment of the present invention showing both information flow and product flow.

DETAILED DESCRIPTION

The present invention provides a method for monitoring the receipt of goods at a purchaser's dock through to the final stocking of the goods to insure that there is no mishandling or pilferage of the goods.

Referring to the FIGURE, a vendor is provided with a system control sheet 10 from which he wands, with an input wand 12, his codes which represent vendor identification numbers. The input wand 12 is used to read the bar codes using, for example, a wand bar code reader such as the Intermec 9000, manufactured in Seattle, Washington. This type of unit is generally known as a light wand bar reader. The wand 12 is coupled by way of a line 14 to a micro/mini computer 16 such as an IBM XT Personal Computer or IBM Series I. Many models of computers are applicable for this function. The computer 16 records the information provided by the wanded system control sheet 10 provided by the vendor. The computer 16 then transmits a command and information through a line 18 to a printer 20 which in turn produces a worksheet 22.

The vendor utilizes the worksheet(s) 22 to record his invoice number, route number, and an itemized listing of the type and number of units of the goods delivered and/or returned. After the worksheet 22 has been completed by the vendor, he wands, using input wand 12, the bar codes representing each item delivered or returned and quantity delivered and/or returned, which results in this information being recorded in the computer 16. After wanding all items delivered or returned, the vendor wands a bar code using wand 12 which indicates completion of the worksheet scanning operation.

The computer 16 is further connected via a line 28 to a printer 30. The printer 30 produces a store check-in sheet 32 listing the number and types of goods as indicated by the worksheet 22 input by the vendor using wand 12. The vendor checks the check-in sheet 32 against the goods that he has delivered and compares it to the worksheet 22. If the store check-in sheet 22 does not match the goods being delivered, the vendor obtains a new check-in sheet 32 via wand 12 entry. A revised store check-in sheet 32 is again examined by the vendor. This procedure is repeated until the store check-in sheet 32 is accurate as determined by the vendor.

After the vendor has verified the store check-in sheet 32, he transfers the goods to the custody of the receiving clerk. In the product flow, this is indicated by the transfer of the goods to the location 34 marked "Release On Approval." The store check-in sheet 32 is transferred to the Receiving Clerk Audit indicated by function 36. At this point, the receiving clerk performs an independent count of the goods at location 34. If this count corresponds to the store check-in sheet 32, the clerk provides a release which is transmitted through line 38 to the location 34 indicating that the goods stored at location 34 can be moved for stocking. The clerk must indicate acceptance of the delivery by entering via wand 12 the invoice number and total dollar amount. Printer 30 is then activated via computer 16 and produces a store invoice 33. The clerk and vendor must sign both copies of the invoice 33. The clerk maintains one copy of the store invoice 33 and the second copy remains with the goods until final stocking. After the final stocking, the second copy of the store invoice 33 is provided to the vendor.

If the clerk's audit does not match the store check-in sheet 32, the clerk wands, using wand 12, certain bars on the system control sheet 10 constituting a receiving clerk audit. The store clerk wands bars representing clerk identification number, the store invoice number, the total dollar value of the shipment, the item codes and the quantity of each item which is short or long to indicate a discrepancy.

When there is such a discrepancy, the receiving clerk and the vendor must work together to find the discrepancy. When the error has been found, the vendor and clerk enter via wand 22 the short or over which is then input to the computer 16 to create a correct store invoice 33. This procedure is repeated until the receiving clerk has a match between the store invoice 33 and the goods held at location 34. When such a comparison is correct, the receiving clerk prepares a release, as noted above, which is transmitted through line 38 to location 34.

Upon receipt of the release from the receiving clerk, the goods are transferred from location 34 to a management audit location 46. Management audit location 46 and its related function are optional.

At location 46 a management agent may perform counts of random batches of goods which have been received. If there is no discrepancy from the store invoice 33, the management agent enters via wand 12 the management agent identification number, store invoice number and total dollar volume.

If the management agent detects an over or under count in his random sample by batches, the management agent enters via line 48 for input using wand 12 as indicated above but there is further included a notation of the item and quantity short and/or long. This data is then recorded in the computer 16.

As a further precaution, there may be an optional security audit at location 50 for random samples of batches of goods that have either been placed at location 34 or subsequent to the management audit at location 46. This audit is indicated by line 52. The security audit at location 50 completes a verification count similar to that of the management audit and submits it via line 54 for input using wand 12 and recording in the computer 16. After the goods have been released by the clerk from location 34 and the optional management and security audits have been completed, the goods are transferred to a stocking location which is indicated by the function product stocked 56.

At periodic intervals, the information stored in the computer 16 is transmitted via a communication line 60 to an auxillary operation function 62. At function 62, the vendor stored information from the vendor's counts, the clerk's count and the optional management and security counts of the batches of goods are compared to find any discrepancies. These discrepancies are then analyzed to determine any trend in losses such as, for example, losses relating to a specific vendor, a specific vendor driver, losses incurred when a specific vendor and specific clerk are working together, losses occurring after product release by the clerk, losses for a particular type of goods, and any other type of losses that can be determined from the various information entered by the vendor, clerk, management and security counts. This loss information is then released by function 62 and represented as management reports 64. The resulting management reports 64 can be utilized by the management to take appropriate corrective steps to prevent any further theft or pilferage of the goods provided by a vendor at the receiving dock.

In summary, the present invention comprises a method for monitoring the delivery and stocking of goods at a direct receipt delivery dock where a count of the goods must be made by the vendor as well as the receiving clerk. Further counts can be made on a random basis by a management agent or a security audit. As a result of the various counts, it is possible to determine trends and specifics of losses to aid management in controlling the loss of inventory.

Having described the invention in connection with a certain specific embodiment, it is to be understood that further modifications may now suggest themselves to those skilled in the art, and it is intended to cover such modifications as fall within the scope of the appended claims.

We claim:

1. A method for tracing discrepancies of goods occurring during delivery of discrete identifiable units, comprising the steps of:
    (a) preparing and storing in a memory on a batch by batch basis a vendor's count of the units in each batch of delivered goods;
    (b) preparing and storing in said memory on a batch by batch basis a clerk's count of the units in each batch of goods acknowledged as received by the clerk;
    (c) comparing said vendor's count and said clerk's count of the units in each batch of goods and producing a store invoice for each batch;
    (d) preparing and storing in said memory a management count of units in selected batches of goods prior to stocking said goods in inventory; and
    (e) comparing said store invoice to said management count of units in at least one of said selected batches whereby trends in discrepancies between said vendor's, clerk's and management counts for corresponding batches indicate unlawful or inaccurate handling of said goods.

2. The method recited in claim 1 wherein the step of preparing and storing a vendor's count comprises the steps of:
   providing a worksheet having bar code information for use by said vendor to record the count of units in each batch; and
   reading said vendor's worksheet with a wand bar code reader and transferring the information read to said memory.

3. The method recited in claim 1 wherein steps (a) and (b) are repeated until said counts of units in each batch are the same.

4. The method recited in claim 1 including the step of printing a store invoice based on said clerk's count and said vendor's count of the units in each said batch.

5. A method for monitoring delivery of goods by a vendor to detect discrepancies and pilferage of goods, comprising the steps of:
   (a) scanning precoded bars on a system control sheet to identify the vendor;
   (b) storing the scanned vendor identification in a computer;
   (c) printing a worksheet having bar code information for use by said vendor;
   (d) scanning said worksheet bar code information to record a vendor's count of units in each batch of delivered goods;
   (e) storing the scanned worksheet bar code information and vendor's count in said computer;
   (f) printing a store invoice for said delivered goods using said stored worksheet bar code information and vendor's count;
   (g) scanning a store check-in sheet having bar code information to record a clerk's audit including a count of units in each batch of delivered goods;
   (h) storing said clerk's audit information in said computer; and
   (i) comparing said vendor's count and said clerk's audit information to detect any discrepancies in the counts for said goods.

6. The method recited in claim 5 including the steps of:
   (a) conducting a management audit to provide a management count of units in selected batches of delivered goods; and
   (b) storing said management audit information in said computer.

7. The method recited in claim 6 wherein the step of comparing said vendor's count and said clerk's audit information to detect any discrepancies includes comparing said management audit information.

8. The method according to claim 6 including the step of generating a new store invoice when discrepancies are found between said management audit and said clerk's audit.

9. The method according to claim 6 including the steps of:
   conducting a security audit of selected batches of said goods; and
   generating a new store invoice when discrepancies are found between said security audit and said clerk's audit.

10. The method recited in claim 5 including the step of holding said goods pending receipt of a release by said clerk after storing and comparing said clerk's audit information.

* * * * *